United States Patent [19]

Kato et al.

[11] Patent Number: 4,611,465
[45] Date of Patent: Sep. 16, 1986

[54] EXHAUST GAS BY-PASS SYSTEM IN A TURBOCHARGER FOR AN INTERNAL COMBUSTION ENGINE

[75] Inventors: Yuuichi Kato, Susono; Mitsuyuki Ugajin, Okazaki; Tatsuya Kawakita, Aichi, all of Japan

[73] Assignee: Toyota Jidosha Kabushi Kaisha, Aichi, Japan

[21] Appl. No.: 660,885

[22] Filed: Oct. 15, 1984

[30] Foreign Application Priority Data

Jun. 22, 1984 [JP] Japan .................. 59-127283

[51] Int. Cl.[4] ........................................... F02B 37/12
[52] U.S. Cl. ........................................................ 60/602
[58] Field of Search .................. 60/600, 601, 602, 603

[56] References Cited

U.S. PATENT DOCUMENTS

| 4,120,156 | 10/1978 | McInerney | 60/602 |
| 4,177,006 | 12/1979 | Nancarrow | 60/602 X |
| 4,356,695 | 11/1982 | Sumi et al. | 60/602 |
| 4,418,535 | 12/1983 | Ecomard | 60/602 |
| 4,443,153 | 4/1984 | Dibelius | 60/602 X |
| 4,530,640 | 7/1985 | MacInnes | 60/602 X |

FOREIGN PATENT DOCUMENTS

| 2633587 | 2/1978 | Fed. Rep. of Germany | 60/602 |
| 2948089 | 6/1981 | Fed. Rep. of Germany | 60/602 |
| 2948061 | 7/1981 | Fed. Rep. of Germany | 60/602 |
| 0137619 | 8/1982 | Japan | 60/602 |
| 2038940A | 7/1980 | United Kingdom | 60/602 |
| 2066365A | 7/1981 | United Kingdom | 60/602 |

*Primary Examiner*—Michael Koczo
*Assistant Examiner*—Randolph A. Smith
*Attorney, Agent, or Firm*—Parkhurst & Oliff

[57] ABSTRACT

An exhaust by-pass system in an internal combustion engine provided with a turbocharger. The turbocharger is the so-called twin entry type having a pair of scroll passageways connected to two groups of cylinders of the engine, respectively. By-pass passageways are formed in a housing of the turbine of the turbocharger. The by-pass passageways are connected to scroll passageways, respectively at positions near their inlets. The by-pass passageways are opened or closed by a common by-pass control valve arranged in a tubular boss portion of the housing.

9 Claims, 11 Drawing Figures

EXHAUST GAS BY-PASS SYSTEM IN A TURBOCHARGER FOR AN INTERNAL COMBUSTION ENGINE

BACKGROUND OF THE INVENTION (1) Field of the Invention

The present invention relates to a turbocharger for an internal combustion engine, more particularly to a device for by-passing a part of the exhaust gas introduced into the turbocharger to limit the maximum intake air pressure.

(2) Description of the Prior Art

In a known turbocharger for a multi-cylinder internal combustion engine, the turbine housing is divided into a pair of juxtaposed scroll passageways. This type of turbocharger, called a "twin-entry type," enables effective use of the pressure wave generated in the flow of exhaust gas from the engine. The cylinders in this type of turbocharger are divided into first and second groups, so that the ignition strokes occur alternately between the two groups. These groups have respective exhaust manifolds connected to the respective scroll passageways in the turbine housing. As a result of this construction, exhaust ports of every two cylinders attaining two adjacent ignition strokes are separate from each other. Therefore, the pressure wave formed in each exhaust port is effectively maintained without weakening by the pressure in the exhaust port attaining the subsequent ignition stroke. The exhaust gases from the divided groups are independently introduced into the respective scroll passageways in the turbine housing.

All turbochargers, not only the twin-entry type, need a valve device (called a waste gate valve) for by-passing a part of the exhaust gas when the exhaust gas pressure becomes higher than a predetermined limit. In a twin-entry type turbocharger, this by-pass valve must be able to control the two divided passageways.

Japanese Unexamined Utility Model Publication (Kokai) No. 56-161138 discloses the provision of a pair of by-pass passageways opened to the scroll passageways. The by-pass passageways are selectively opened or closed by means of a common by-pass control valve arranged in the housing. In this prior art reference, however, since the by-pass passageways are opened directly to the scroll passageways, turbulence is generated in the flows of the exhaust gas in the scroll passageways. This decreases the efficiency of supercharging.

Another prior art reference, Japanese Unexamined Utility Model Publication (Kokai) No. 57-139635, discloses an exhaust by-pass system for a twin-entry type turbocharger wherein by-pass passageways are opened to the exhaust pipes at positions spaced from the scroll passageways. This prevents turbulence in the flows of the exhaust gas in the scroll passageways. In this utility model, however, the by-pass device is arranged outside of the turbine housing. This is disadvantageous in that it increases the dimensions of the device itself. Also, extra parts are required for the by-pass passageways located outside of the housing and the assembly of the device is complicated.

SUMMARY OF THE INVENTION

An object of the present invention is to provide a by-pass control device capable of overcoming the abovementioned difficulties encountered in the prior art.

Another object of the present invention is to provide a by-pass control device wherein substantially the entire by-pass system can be arranged in the turbine housing without turbulence in the flows of the exhaust gas in the scroll passageways.

According to the present invention, there is provided an internal combustion engine including an engine body having a plurality of cylinders; intake passageway means for introducing air into the engine; first exhaust passageway means connected to a first group of cylinders; second exhaust passageway means connected to a second group of the cylinders; a turbine unit for receiving energy of the exhaust gas; a discharge passageway means for receiving the exhaust gas from the turbine unit; and a compressor unit operated by the turbine unit for compressing the air in the intake passageway means. The turbine unit includes a housing; a turbine wheel arranged in the housing; a pair of juxtaposed scroll passageways formed between the housing and the turbine; the housing having an inlet opened tangentially to the turbine wheel for connecting the scroll passageways with the first and second exhaust passageway means, respectively, and an outlet opened axially to the turbine wheel and connected to the discharge passageway means; a tubular boss portion extending axially at a position radially spaced from the outlet and adjacent to the inlet, the tubular boss portion defining a bottom inner surface; by-pass passageway means having a substantial portion formed in the housing, the by-pass passageway means having first ends opened, at positions near the inlet, to the flows of the exhaust gas introduced into the juxtaposed scroll passageways, respectively, and at least one second end extending to the bottom surface of the tubular portion; by-pass control valve means arranged in the tubular portion for selectively opening or closing the second end of the by-pass passageway means; and actuator means responsive to the pressure of the air in the intake means substantially downstream of the compressor unit for operating the by-pass control valve.

DESCRIPTION OF THE PREFERRED EMBODIMENTS

Figure 1:
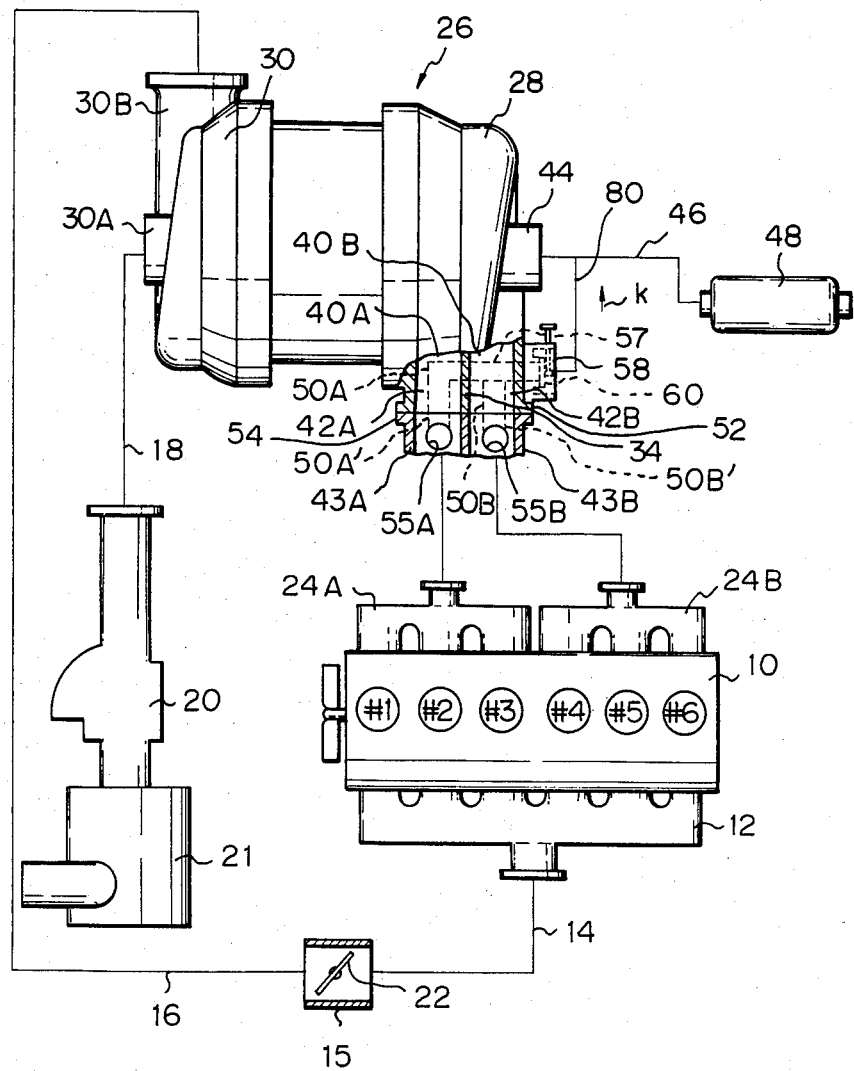
FIG. 1 shows generally an internal combustion engine according to the present invention.

In FIG. 1, reference numeral 10 designates a body of a six-cylinder internal combustion engine. Reference numeral 12 denotes an intake mainfold which is connected, via an intake pipe 14, to a throttle body 15 and via intake pipes 16 and 18 to an air flow meter 20. The air flow meter 20 is connected to an air cleaner 21. A throttle valve 22 is arranged in the throttle body 15.

The engine is provided with a pair of exhaust manifolds 24A and 24B, which are connected to first and second groups of cylinders, respectively. The first group is comprised of the first, second, and third cylinders, whereas the second group is comprised of the fourth, fifth, and sixth cylinders. In every operational cycle of the engine, ignition occurs in the order of the first (#1) cylinder, fifth (#5) cylinder, third (#3) cylinder, sixth (#6) cylinder, second (#2) cylinder and fourth (#4) cylinder. This means that ignition takes place alternately between the first and the second cylinder groups. This prevents, as is well known to those skilled in the art, so-called exhaust interference. This allows utilization of the pressure wave from the engine without weakening and thus effective operation of a turbocharger connected to the exhaust manifolds.

Reference numeral 26 designates a turbocharger, which has a turbine housing 28 and a compressor housing 30. The scroll-shaped compressor housing 30 has an inlet pipe 30A opened to the center portion of a compressor wheel (not shown) and an outlet pipe 30B opened tangentially to the compressor wheel. The inlet pipe 30A is connected to the intake pipe 18 to receive the flow of air from the air flow meter 20. The outlet pipe 30B is connected to the intake pipe 16 in order to introduce the supercharged air into the engine 10 by way of the intake manifold 12.

Figure 2:
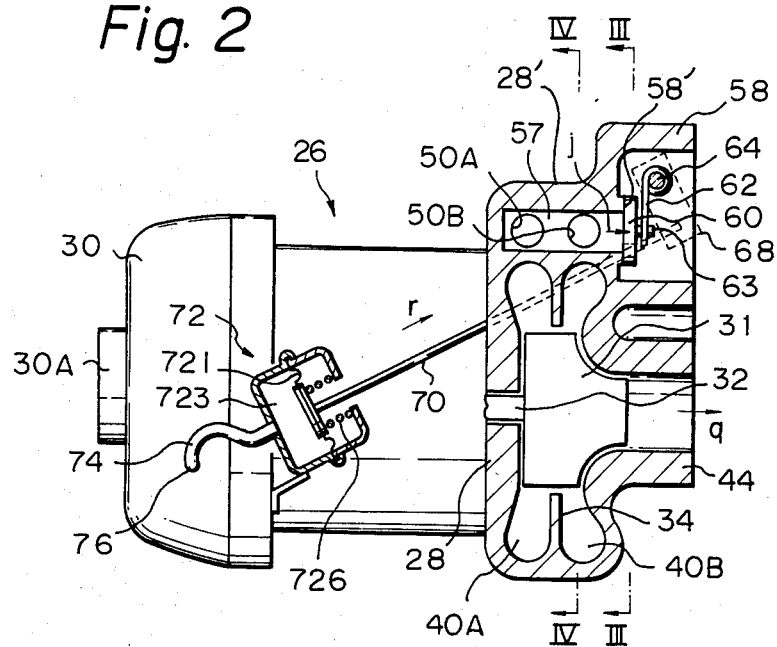
FIG. 2 is a side, partially cross-sectional view of a turbocharger in FIG. 1.
Figure 4:
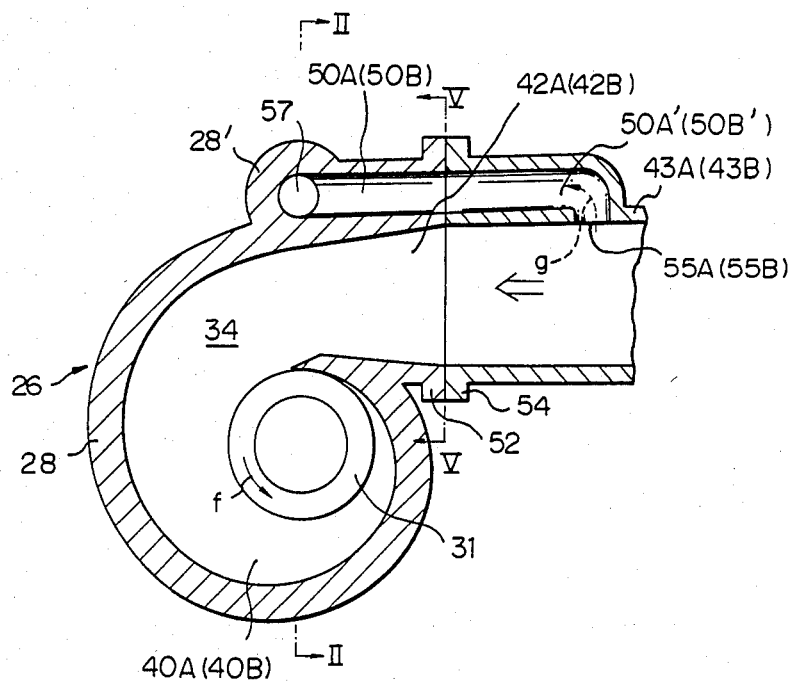
FIG. 4 is a view taken along line IV—IV in FIG. 2.
Figure 5:
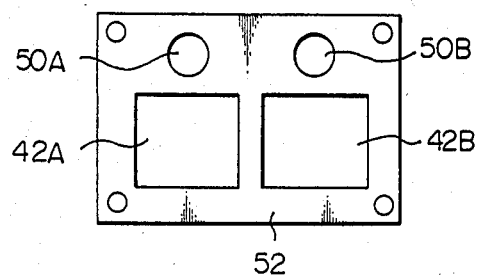
FIG. 5 is a view taken along line V—V in FIG. 4.

The turbine housing 28 also has a scroll shape and houses a turbine wheel 31 (FIG. 2). The turbine wheel 31 is connected to the compressor wheel in the compressor housing 30 by means of a shaft 32. The turbine housing 28 has therein a partition wall 34 (FIGS. 1, 2, and 4) so as to form a pair of juxtaposed scroll passageways 40A and 40B. The passageways 40A and 40B extend to juxtaposed inlets 42A and 42B, respectively, which are tangentially opened to the turbine wheel 31, as shown in FIGS. 4 and 5. The inlet pipes 42A and 42B are connected to the exhaust manifolds 24A and 24B, respectively, by means of exhaust pipes 43A and 43B, respectively. As shown in FIG. 1, the housing 28 is provided with a discharge pipe 44 opened to the turbine wheel in the axial direction of the turbine shaft, which pipe 44 is connected to a muffler 48 by way of an exhaust pipe 46.

According to the present invention, the turbine housing 28 has, at a position near the inlets 42A and 42B, an outwardly raised portion 28' in which by-pass passageways 50A and 50B, which are parallel to the inlet pipes 42A and 42B, respectively, are separately formed. The housing 28 has a flange portion 52 (FIGS. 4 and 5), to which the by-pass passageways 50A and 50B are opened. As shown in FIG. 4, the exhaust pipes 43A and 43B have, at their walls, by-pass passageways 50A' and 50B', respectively. The exhaust pipes 43A and 43B have a common flange portion 54 to which the by-pass passageways 50A' and 50B' are opened. These flange portions 52 and 54 are connected with each other so that the by-pass passageways 50A and 50B in the compressor housing 28 communicate with the by-pass passageways 50A' and 50B' in the exhaust pipes 43A and 43B, respectively. As shown in FIGS. 1 and 4, the by-pass passageways 50A' and 50B' are opened inside of the exhaust pipes 43A and 43B by means of openings 55A and 55B, respectively.

Figure 3:
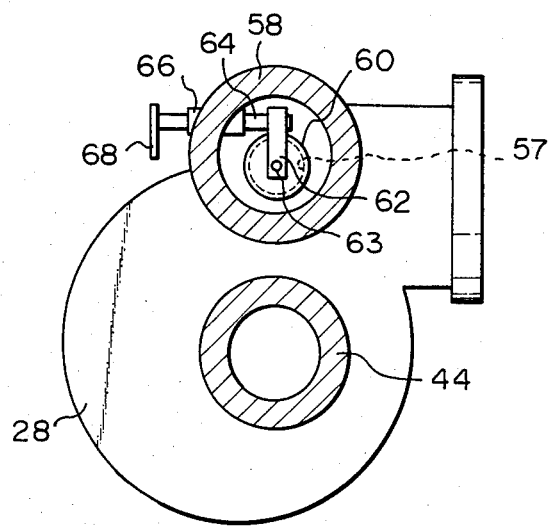
FIG. 3 is a view taken along line III—III in FIG. 2.

The housing raised portion 28' has a common passageway 57 which extends along the direction of the axis of the turbine shaft. The passageway 58 is closed at its bottom. The by-pass passageways 50A and 50B are, at the ends opposite to the openings 50A' and 50B', opened to the common passageway 57. As shown in FIGS. 2 and 3, the housing 28 is provided with a tubular portion (boss) 58 which extends from the raised portion 28' in the same direction as the turbine outlet 44. The tubular portion 58 has a bottom inner surface 58' extending transverse to the turbine axis, to which the common passageway 57 is opened at its end opposite to the closed end.

In the tubular portion 58, facing the bottom surface 58' acting as a valve seat, by-pass control valve 60, i.e., a "waste gate valve", is arranged. The by-pass control valve 60 is of a swing type having an arm 62, one end of which is connected to the valve 60 by means of a pin 63. The arm 62 is, at the other end, connected to a pivot shaft 64. The pivot shaft 64 is, as shown in FIG. 3, supported on the housing tubular portion 58 by means of a sleeve bearing 66. A second arm 68 is connected to the end of the pivot shaft 64 opposite to the first arm 62. The second arm 68 is connected at its end opposite to the shaft 64 to a diaphragm actuator 72 by means of a link rod 70. The diaphragm actuator 72 has a diaphragm 721 to which the rod 70 is connected. The diaphragm 721 forms on one side opposite to the rod 70 a pressure chamber 723 which is connected to a pressure sensing port 76 by way of a pressure signal transmitting pipe 74. The pressure sensing port 76 is, as well known to those skilled in the art, opened to the inside of the compressor housing 30, so that the pressure chamber 723 can attain a pressure formed substantially downstream of the compressor wheel in the compressor housing 30. The actuator has a spring 726 urging the diaphragm 721 so that the by-pass control valve 60 is usually seated on the valve seat 58' in order to normally close the by-pass system. It should be noted that the diaphragm actuator 72 is in this embodiment located near the compressor housing 30, which has relatively low temperature, and therefore spaced from the turbine housing 28, which attains a high temperature during the operation of the engine due to the high temperature of the exhaust gas introduced into the turbine housing. As a result, parts of low heat resistance such as the diaphragm 721 made from rubber, may be effectively protected.

The tubular portion 58 in which the by-pass control valve 60 is arranged is connected to the exhaust pipe 46 at a position downstream of the turbine outlet 44 by means of a by-pass pipe 80 (FIG. 1).

Figure 6:
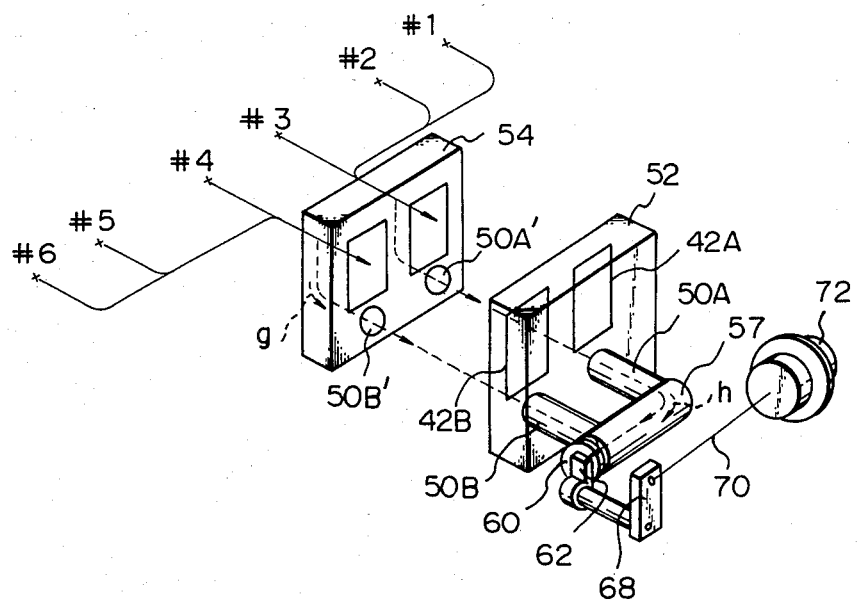
FIG. 6 is a perspective view schematically illustrating the by-pass system according to a first embodiment of the present invention.

FIG. 6 is a perspective view schematically illustrating the construction of the by-pass system according to the present invention.

The operation of the present invention will now be described. The exhaust gas from the first group of cylinders #1, #2, and #3 and the second group of cylinders #4, #6, and #5 is introduced into the exhaust manifolds 24A and 24B, respectively. The exhaust gas in the exhaust manifolds 24A and 24B are, as shown by the solid lines in FIG. 6, introduced into the scroll inlets 42A and 42B via the flange portions 54 and 52. The exhaust gas is then introduced into the scroll passageways 40A and 40B (FIG. 4) in the tangential direction, causing the turbine wheel 31 to be rotated as shown by an arrow f. The exhaust gas is then exhausted from the outlet 44 as shown by an arrow q in FIG. 2.

The rotation of the turbine wheel 31 causes the compressor in the compressor housing 30 to rotate, so that the air is introduced into the engine 10 via the pipe 16, the throttle body 15, and the intake pipe 14 and the intake manifold 12 in a compressed state. When the pressure of the compressed air sensed at the port 76 in FIG. 2 is lower than the predetermined level, the spring 726 causes the diaphram 721 to move away from the turbine housing 28. As a result, the pivot shaft 64 is rotated by means of the link 70 and the arm 68 so that the by-pass control valve 60 is seated on the valve seat 58'. Therefore, the passageway 57 connected to the passageways 50A and 50B is closed.

When the pressure of the compressed air is higher than the predetermined level, the diaphragm 721 is moved against the spring 726 toward the turbine housing 28, as shown by an arrow r in FIG. 2, causing the pivot shaft 64 to be rotated by means of the link 70 and the arm 68, so that the by-pass control valve 60 is moved away from the valve seat 58'. Therefore, as shown by dotted lines g in FIG. 6, the exhaust gas in the exhaust pipes 43A and 43B is partly introduced into the by-pass passageways 50A' and 50B', as shown by an arrow g, in FIGS. 4 and 6. Then, the by-passed exhaust gas is introduced into the by-pass passageways 50A' and 50B' and introduced into the common passageway 57. The exhaust gas in the passageways is then introduced into the tubular portion 58 via the by-pass control valve 60, which is now opened, as shown by an arrow j in FIG. 2. The exhaust gas is finally introduced into the exhaust pipe 46 via the pipe 80 as shown by an arrow k in FIG. 1. Due to such by-passing of the exhaust gas, the amount of the exhaust gas directed to the turbine 31 is decreased and, therefore, the rotational speed of the turbine is decreased. Thus, the pressure of the intake air introduced into the engine from the turbocharger does not exceed the value determined by the strength of the spring 726 of the actuator 72.

Figures 7, 10:
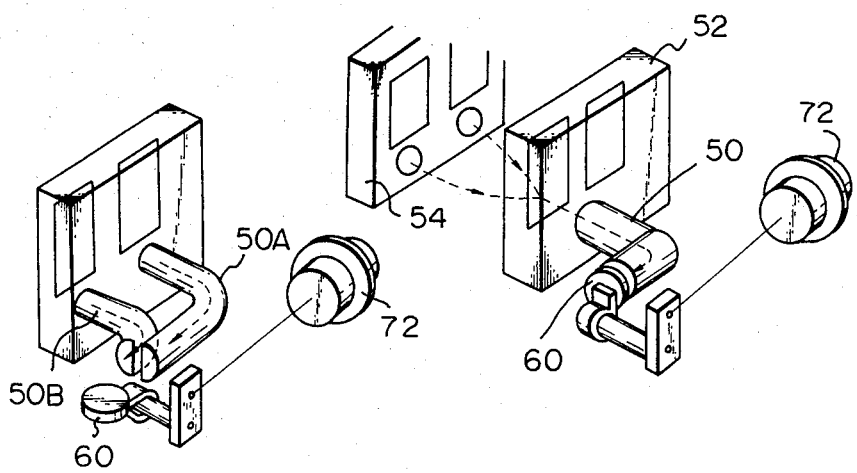
FIG. 7 is a perspective view schematically illustrating a by-pass system of a second embodiment.
FIG. 10 is a perspective view schematically illustrating a by-pass system in the third embodiment.
Figure 8:
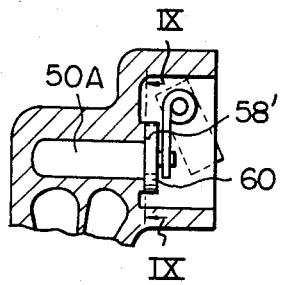
FIG. 8 is a partial view corresponding to FIG. 2 in the second embodiment.
Figure 9:
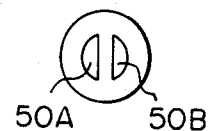
FIG. 9 is a view taken along IX—IX line in FIG. 8.

In a second embodiment shown in FIG. 7, in place of the common passageway 57 in the first embodiment, each of the by-pass passageways 50A and 50B is extended to the valve seat 58' (FIGS. 8 and 9) so that they are opened or closed by a by-pass control valve 60.

Figure 11:
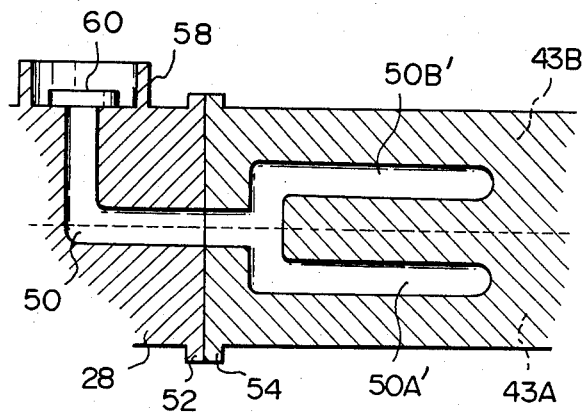
FIG. 11 is a cross-sectional view illustrating a construction of the by-pass passageway in the third embodiment.

In a third embodiment shown in FIG. 10, the by-pass passageways 50A' and 50B' are joined together at a position before the flange 54 (FIG. 11) in the wall of the pipes 43A and 43B, and the housing has only a by-pass passageway 50 which is opened or closed by a by-pass control valve 60 in the boss portion 58.

The most important feature of the present invention is that smooth flows are attained in the scroll passageways 40A and 40B without any turbulence therein because the by-pass passageways 50A and 50B are opened at positions upstream of the scroll passageways 40A and 40B. In addition, the by-pass system is substantially entirely arranged in the housing 28, together with the waste gate valve, and therefore a compact construction is realized.

It should be noted many modifications and changes may be made by those skilled in this art without departing from the scope of the present invention. For example, in place of arranging the by-pass passageways 50A' and 50B' in the wall of the exhaust pipes 43A and 43B, as is the case in the illustrated embodiments, the passageways 50A and 50B may be directly opened to the inlets 42A and 42B, respectively. This modification is preferable in view of a simplified construction of the by-pass system.

What is claimed is:

1. An internal combustion engine comprising:
   an engine body having a plurality of cylinders;
   intake passageway means for introducing air into the engine;
   first exhaust passageway means connected to a first group of the cylinders;
   second exhaust passageway means connected to a second group of the cylinders;
   a turbine unit for receiving exhaust gas from the exhaust passageway means and for receiving energy from the thus received exhaust gas;
   a discharge passageway means for receiving the exhaust gas from the turbine unit; and
   a compressor unit operated by the turbine unit for compressing the air in the intake passageay means;
   wherein said turbine unit comprises:
   a housing;
   a turbine wheel having a central axis, said turbine wheel being mounted in the housing for rotation about its axis;
   a shaft co-axial with said axis and mechanically connecting the turbine wheel to the compressor unit;
   a pair of scroll passageways juxtaposed along said axis and around said turbine wheel, the scroll passageways being formed between the housing and the turbine;
   said housing having an inlet opening in a position adjacent and tangential to the turbine wheel for connecting the scroll passageways with the first and second exhaust passageway means, respectively, and an outlet opening in a position adjacent to and substantially along the axis of the turbine wheel and connected to the discharge passageway means;
   a tubular boss portion extending away from a main body of said housing and being disposed substantially parallel to said axis at a position radially spaced from the outlet and adjacent to the inlet, an end of said tubular boss portion closest to said main body being closed and defining a bottom inner surface;
   by-pass passageway means extending substantially in a plane tangentially to said axis, a substantial portion of said by-pass passageway means being formed in the housing, said by-pass passageway means having first ends opening, in said exhaust passageway means near and upstream of the inlet, to the flows of the exhaust gas introduced into the juxtaposed scroll passageways and at least one second end extending to said bottom inner surface of the tubular boss portion;
   by-pass control valve means arranged in said tubular boss portion for selectively opening or closing the at least one second end of the by-pass passageway means; and
   actuator means responsive to the pressure of the air in the intake means downstream of the compressor unit for operating the by-pass control valve.

2. An internal combustion engine according to claim 1, wherein said first ends of the by-pass passageway means are opened to the first and the second exhaust passageway means, respectively, at positions near the inlet of the turbine housing, and wherein said by-pass passageway means comprises a first section formed in the turbine housing and a second section located in a wall in which the first and the second passageway means are formed.

3. An internal combustion engine according to claim 1, wherein said first ends of the by-pass passageway means are opened to the first and the second scroll passageways near the inlet and wherein the by-pass passageway means are entirely formed in the turbine housing.

4. An internal combustion engine according to claim 1, wherein said by-pass passageway means comprises first and second passageways having ends defining said first ends, respectively, and a common passageway having one closed end, said first and second passageways being connected on the other ends to the common passageway, said common passageway defining at the other end thereof said at least one second end of the bypass passageway means.

5. An internal combustion engine according to claim 1, wherein said by-pass passageway means has two said second ends and comprises first and second pasageways, which have ends defining said first ends, respectively, and opposite ends defining said second ends, respectively.

6. An internal combustion engine according to claim 1, wherein said by-pass control valve means comprises a swing type valve member and bearing means for pivoting the valve member at an axis between a position wherein the by-pass passageway means is opened and a position wherein the by-pass passageway means is closed.

7. An internal combustion engine according to claim 1, wherein said actuator means comprises a diaphragm mechanism responsive to intake pressure, pipe means for introducing a pressure signal corresponding to a compressed condition of the air, and link means for mechanically connecting the diaphragm mechanism to the by-pass control valve means.

8. An internal combustion engine according to claim 7, wherein said diaphragm mechanism is mounted on the compressor unit.

9. An internal combustion engine according to claim 7, wherein said pipe means is connected to the compressor unit so that the pipe means opens inside of the unit.

* * * * *